March 22, 1966 M. CEGLIA 3,242,277
SENSOR SWITCH FOR USE WITH APPARATUS FOR DETERMINING
THE SOFTENING POINT OF BITUMINOUS MATERIALS
Original Filed Dec. 28, 1962 2 Sheets-Sheet 1
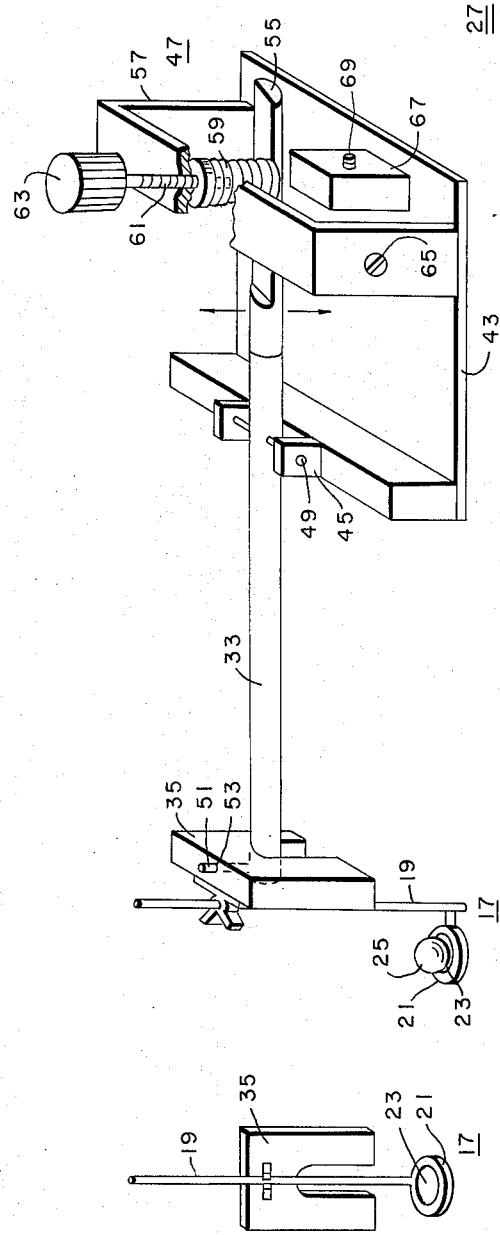
Fig. 1a.
Fig. 1b.
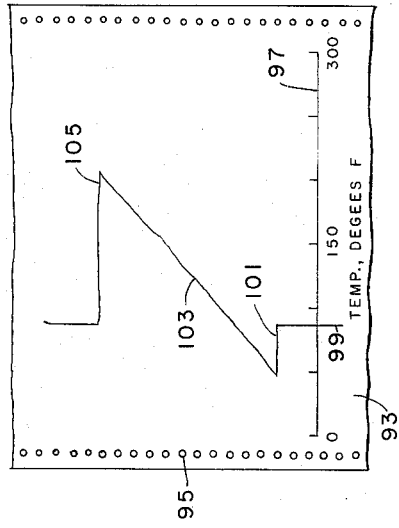
Fig. 3
INVENTOR.
Michael Ceglia INVENTOR.
Michael Ceglia

United States Patent Office

3,242,277
Patented Mar. 22, 1966

3,242,277
SENSOR SWITCH FOR USE WITH APPARATUS FOR DETERMINING THE SOFTENING POINT OF BITUMINOUS MATERIALS
Michael Ceglia, Blackwood, N.J., assignor to The Atlantic Refining Company, Philadelphia, Pa., a corporation of Pennsylvania
Original application Dec. 28, 1962, Ser. No. 248,124. Divided and this application July 20, 1964, Ser. No. 383,769
1 Claim. (Cl. 200—52)

The present case is a divisional application of my co-pending application Serial No. 248,124, filed December 28, 1962.

This invention relates to a sensor switch suitable for testing the softening point of bituminous materials. More specifically, the invention relates to an improved sensor switch for testing these materials using the standard ring and ball method approved by the American Society for Testing Materials and designated method D–36–26.

Various types of devices for testing the softening point of materials are available today. These devices vary in their degree of utility and automation; however, none of these devices, to my knowledge, embrace the combination of accuracy, utility, and automation peculiar to the present invention.

Accordingly, it is an object of the present invention to provide an improved sensor switch suitable for use in practicing the approved A.S.T.M. method for determining the softening point of bituminous materials.

Another object of the present invention is to provide a sensor switch that detects an unbalanced condition and immediately thereafter switches an electrical circuit.

These and other objects will become apparent when the specification is read in light of the appended drawings.

FIGURE 1a shows an isometric drawing of the sensor switch.

FIGURE 1b shows a front view of the sample holder shown in FIGURE 1a.

FIGURE 3 shows a sample record made by the invention.

Figure 2:
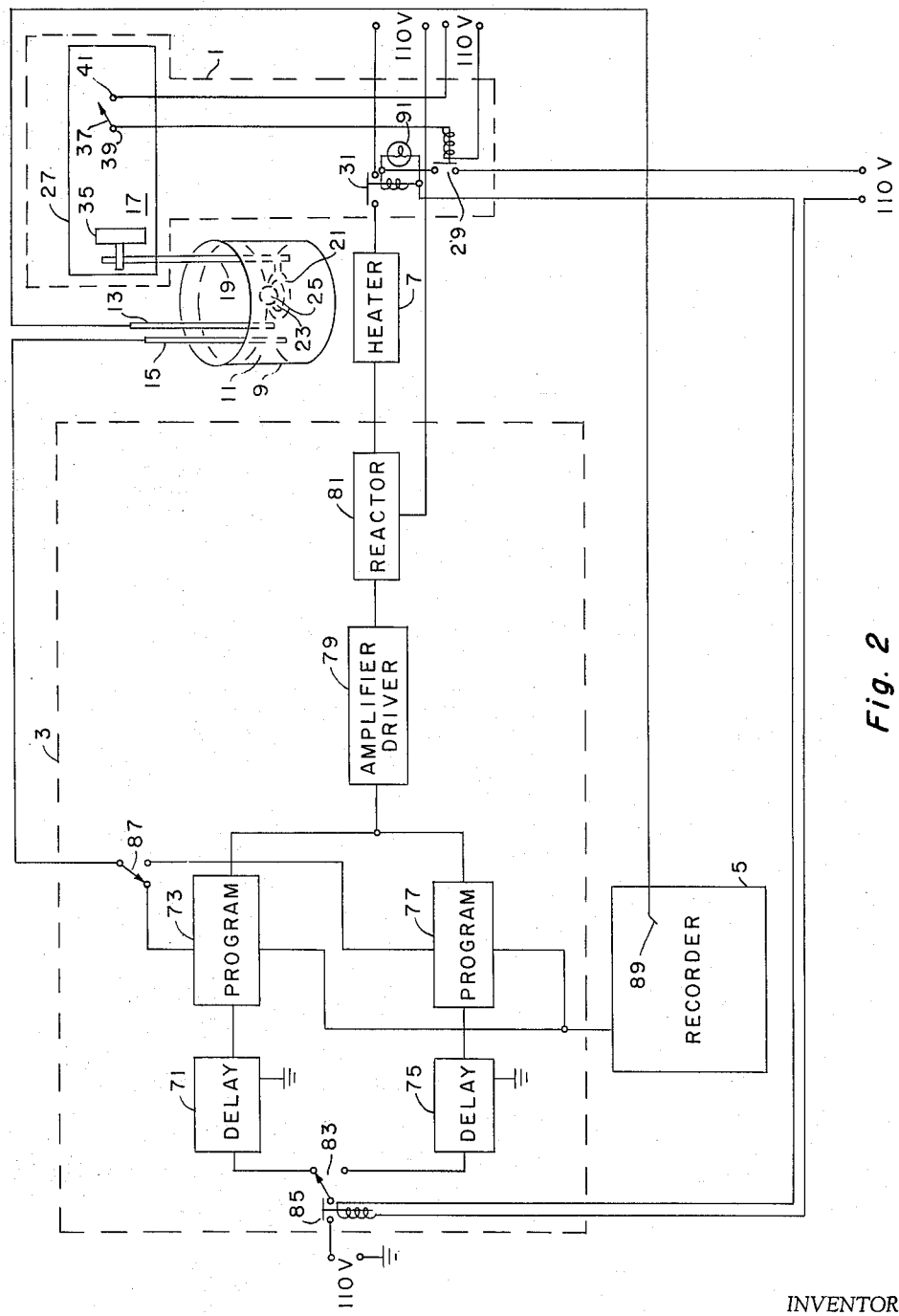
FIGURE 2 shows a schematic drawing of one embodiment of the invention.

Briefly described, the invention comprises an improved sensor switch made up of a novel combination of commercially available components. The sensor switch accurately detects an unbalanced condition at which time electromechanical switching action takes place. The presently disclosed sensor switch is especially adapted for use with an automatic softening point tester such as shown herein and described more fully in copending application Serial No. 248,124, filed December 28, 1962.

Referring now to the drawings:

FIGURE 1a is a simplified isometric drawing of sensor switch 27 of this invention. The sensor switch includes nonconductive base 43 mounting pivot means 45, mechanical actuator means 47, balance arm 33, and support means 35 for holding ring and ball tester 17. Pivot means 45 includes pin 49. Ring and ball tester 17 includes rod 19 connected to ring 21 which in turn supports bituminus sample 23 and ball 25. Balance arm 33 moves about pin 49 as shown. One end of arm 33 supports upright pin 51 which passes through aperture 53 in support means 35. This arrangement allows 35 to be removed and replaced on arm 29 at will. The other end of arm 33 includes brass section 55 which is screwed into the "Bakelite" portion of arm 33. Mechanical actuator means 47 is designed to switch an electrical circuit and to bias arm 33 in a given direction as shown. The bias is applied to 55 and is made to counteract the combined weight of 17 and 35 so that balance arm 33 is maintained in a relatively horizontal position until ball 25 leaves 17.

Mechanical actuator means 47 includes generally U-shaped bridge 57, spring 59 resting on 55, screw 61 connected to knob 63, electrical conductor binding post 65 and block 67 positioned under 55. Block 67 includes an electrical conductor binding post 69. Components 55, 57, 59, 61, 65, 67, and 69 are made of an electrically conductive material such as brass. When 55 contacts 67 an electrical path is set up between 65 and 69. Block 67 and bridge 57 are mounted in nonconductive material such as "Bakelite." Normally a nonconductive cover is placed over the actuator means leaving only knob 63 and the nonconductive portions of the sensor switch exposed. If for some reason it is desirable a small microswitch, mercury switch or the like, instead of the switching action of 55 and 67, 65 can be used. Of course, if this is done, the actuator means components need not be made of electrically conductive material.

FIGURE 1b shows a front view of ring and ball tester 17 including rod 19, ring 21, sample 23, and support means 35. Ball 25 (FIGURE 1a) is not shown on sample 23 in order to provide a better pictorial view.

The dimensions and use of the ring-ball tester are prescribed by the American Society for Testing Materials in their method D–36–26. The complete description of this test is set forth on pages 288–290 of the 1960 Book of A.S.T.M. Standards in the section covering standards for bituminous materials for highway construction, waterproofing and roofing.

FIGURE 2 is a detailed schematic diagram of one embodiment of the invention wherein the sensor switch is used in conjunction with an automatic softening point apparatus. Sensor switch 27 and relays 29 and 31 are schematically represented inside electrical control means 1. Sensor switch 27 is diagrammatically represented by a portion of ring and ball tester 17 and switch 37 connected between electrical terminals 39 and 41. For purposes of clarity, electrical connections between major conventional block components are represented by single conductors while relay control circuits are represented by two conductors.

Looking at FIGURE 2 in more detail, container 9 is positioned over heater 7 and contains fluid 11, temperature measuring means 13 and 15 and ring and ball tester 17. Temperature control means 3 is electrically connected to temperature measuring means 15, to heater 7, and to recorder 5. Recorder 5 is also electrically connected to temperature measuring means 13. Electrical control means 1 is electrically connected to temperature control means 3 and is mechanically connected to ring and ball tester 17. The primary purpose of the electrical control means is to automatically actuate temperature control means 3 and heater 7 at the start of the testing operations, to detect the moment the softening point of the sample is reacted to immediately thereafter cut off 3 and 7.

Temperature control means 3 is designed to automatically control heater 7 so that the temperature of liquid 11 is uniformly raised from a predetermined starting temperature, as prescribed by A.S.T.M. method D–36–26, until the softening point of the tested material is reached. The predetermined starting or preheated temperatures of various bituminous materials, the manner in which they are preheated and the rate at which their temperatures are uniformly raised from the starting temperatures are set forth in method D–36–26. This method prescribes that the precooled temperature of bituminous materials with softening points of 80° C. or below is 5° C. For those materials with softening points above 80° C. the prescribed preheated temperature is 32° C. The temperature control means can be adjusted to operate from either starting temperature as will be described hereinafter. Normally, the temperature control means is also used to control the power supplied to the chart drive motor of recorder 5; however, the power can be controlled separately if desired. Various types of commercially available components can be used to instrument temperature control means 3 provided they are modified in light of applicant's teachings. Although the embodiment illustrated in FIGURE 2 utilizes temperature controller components manufactured by the West Instrument Corporation of Chicago, Illinois, other "off-the-shelf" components can be combined and utilized. For instance, an "Electro-Vane" program controller system such as model 152C15–PSH–226 produced by Minneapolis-Honeywell of Philadelphia, Pennsylvania, can be used when modified in light of this disclosure.

Recorder 5 can be any commercially available ink, electric, photographic, etc., recorder that can be adapted to record signals from temperature measuring means 13 as a function of time. Although a West "Marksman" ink recorder is utilized in FIGURE 2, various other recorders such as an "Electronik" Strip Chart Recorder made by Minneapolis-Honeywell, is suited for this type of recording operation.

Temperature measuring means 13 and 15 may be various types of commercially available thermocouples, thermistors or other suitable devices that can be adapted to produce electrical outputs as a function of temperature variations in fluid 11.

Referring again to FIGURE 2, temperature controlling means 3 includes 90 second delay 71 connected to program circuit 73, 120 second delay 75 connected to program circuit 77, amplifier driver unit 79 and reactor 81. Delay 71, program 73 combination and delay 75 program 77 combination are connected in parallel to amplifier driver 79 and reactor 81. Switch 83 is a four pole single throw switch which selectively connects the relay 85 to the input of delay 71 or 75. Switch 87 is also a four pole single throw switch and it selectively connects the output of thermocouple 15 to program 73 or 77. Normally closed relay 29 controls the operation of normally open relay 31 which is connected to heater 7. Although relay 29 is shown as a low current, high sensitivity mechanical relay, an electronic relay such as a 117N7 tube connected to control a suitable switch means in the control circuit of relay 31 can be used.

To enable the invention to test bituminous materials having softening points above and below 80° C. according to method D–36–26, a portion of temperature control means 3 is divided into parallel circuits with similar components. That is, delay circuit 71 and program circuit 73 are similar to delay circuit 75 and program circuit 77 with the exception of the delay times involved. Switches 83 and 87 are used to select the appropriate delay-program circuit for the particular bituminous material to be tested. Looking at the components in more detail, delay circuits 71 and 75 are designed to prevent current from switch 83 reaching their respective programs 73 and 75 until a predetermined time delay has passed. Both delay circuits are bimetallic-type heater actuated time delay relays made by the Amperite Company of New York.

Program units 73 and 77 are identical commercially available components. Each program component includes an instrument unit and a cam driven by a clock motor. The cam is cut to produce a predetermined rate of temperature change as a function of time. A.S.T.M. method D–36–26 requires that the temperature of the sample be increased at a rate of 9 degrees per minute, ±1° F. In operation an arm is connected to follow the surface of the cam and is also connected to an index pointer that is driven along a temperature scale at the required rate of 9 degrees per minute. The instrument unit has an indicating system which is connected through switch 87 to thermocouple 15. This system indicates the temperature at the thermocouple tip with a thermocouple pointer which is positioned above the index pointer. The index pointer has a small light source and a photocell attached to it. The thermocouple pointer has a small, opaque flag attached to it so that when the thermocouple pointer is adjacent the index pointer, the flag interrupts the light beam passing to the photocell. The amount of current passing from the source to the photocell is varied according to the relative positions of the two pointers. This current acts on an error signal passing from the program unit through amplifier driver 79 to reactor 81. The error signal causes 81 to control the amount of electric power applied to heater 7 so that the thermocouple pointer is maintained adjacent the index pointer. The amplifier driver unit has an optional remote control which adjusts the amount of amplification. The remote control unit shows the percent of power being supplied to heating elements in heater 7 and has adjustments for regulating maximum and minimum power reaching the heater. Remote control unit also has an auto-manual operating switch. Reactor 81 is a commercially available transformer-type saturable reactor wherein the amplified current from 79 is used to control the reactance of 81 so that the power supplied to heater 7 is varied in accordance with the amount of current reaching reactor 81. Since the physical positions of the thermocouple pointer and the index pointer are continually varying, the amount of light reaching the photoelectric cell and the resulting current passing to 79 and 81 will continually vary and cause the power input to the heater to automatically vary so as to maintain a uniformly increasing heat rate in container 11. Delay 75 and program 77 are similar in construction and operation to 71 and 73.

The components making up temperature control means 3 can be purchased as "off-the-shelf" items. For instance, the West Instrument Corporation of Chicago, Illinois, manufactures stepless controllers which can be used as program units 73 and 77. In addition, the same company manufactures driver units and reactor units that can be used for the disclosed units 79 and 81. Of course, other similar commercially available or bench made components can be substituted for the components described. Regardless of the source of the particular components used, the subject disclosure enables a person skilled in the art to modify and connect the components so as to produce temperature control means as described.

The chart drive motor of recorder 5 is connected in parallel to program units 73 and 71. The chart drive motor is actuated by the program unit selected by switch 83 when the appropriate delay actuates the program unit. The recorder in this embodiment is a West "Marksman" ink recorder manufactured by the West Instrument Corporation. Thermocouple 13 produces a voltage representing the temperature of fluid 11. This voltage is recorded as temperature vs. time by pen 89. Heater 7 is a conventional 1,000 watt electrical heater made by Precision Scientific Company of Chicago, Illinois.

Consider now the detailed operation of the device illustrated in FIGURE 2. Assume a bituminous sample is to be subjected to the standard softening point test in accordance with method D–36–26. A six hundred milliliter beaker 9 is filled to a depth of 3¼ inches with distilled water or U.S.P. glycerin (depending on the type of sample) and positioned over the 1,000 watt heater 7. Bituminous sample 23 is placed in ring 21, and rod 19 is placed in sample holder 31 so that the sample is the prescribed 1 inch from the bottom of container 9. Thermocouples 13 and 15 are placed in fluid 11 at the same depth as the bottom of the sample. Assume that fluid 11, sample 23 and ball 25 have been heated or cooled to the proper starting temperature for the prescribed length of time. If sample 23 is a low softening point material, switch 83 is moved to connect delay 71 and switch 87 is moved to connect thermocouple 15 to program 72. Continuing in accordance with the prescribed method, ball 25 is placed on sample 23 and sensor switch 27 is balanced. Referring to FIGURE 1a, adjusting knob 63 is rotated until balance arm 33 hangs suspended. In this position section 55 of the arm is separated from and above 67, thereby breaking the circuit. This open switch condition is represented by switch 37 in FIGURE 2. Note that with 37 open normally closed relay 29 is de-energized and closed allowing normally open relay 31 to be energized in the closed position. Pilot light 91 is on indicating that 37 is open. Knob 63, FIGURE 1a, is then rotated in the opposite direction until pilot light 91, FIGURE 2, just goes out. The knob is then rotated in the other direction until the light just goes on. This final adjustment de-energizes relay 29 allowing it to close which in turn energizes heavy duty relay 31 allowing 1,000 watt heater 7 to be actuated. Simultaneously with the actuation of heater 7, relay 29 energizes relay 85 thereby actuating 90 second time delay 71. During this period the required initial heat input needed to start heating fluid 11 is produced before delay 71 actuates program 73 and recorder 5. After 90 seconds of delay, the bimetallic coupling 71 closes allowing current to actuate program 73. The clock motors driving the cam in 73 and the chart drive in recorder 5 are energized. Program 73 operates to insure that heater 7 is regulated to raise the temperature of fluid 11 at a uniform rate of 9 degrees per minute. That is, the heat differential sensed by thermocouple 15 produces a voltage which causes the thermocouple pointer in program 73 to follow the index pointer resting on the cam. When fluid 11's rate of the temperature variation is ahead or behind the programmed rate, the electric current produced by the photoelectric cell changes in a manner to correct for this error. As described heretofore, the current is amplified by 79 and sent to reactor 81 where it varies the reactance of 81 and regulates the power applied to heater 7 accordingly. As the temperature of fluid 11 is heated and reaches the softening point of sample 23, steel ball 25 pushes through the sample and ring 21. As the weight of steel ball 25 leaves ring and ball tester 17, actuator means 47 causes section 55 to contact 67 closing the circuit between binding posts 65 and 69 represented as 39 and 41 in FIGURE 2. When this circuit is closed, relay 29, FIGURE 2, is energized and opens, in turn de-energizing relay 31 and shutting off heater 7 and programmer 73.

FIGURE 3 shows a sample recording made by recorder 5. Chart paper 93 contains drive perforations 95 to facilitate movement of the paper in a conventional manner. The paper bears a plurality of preprinted vertical and horizontal lines. Periodically a line 97 is marked in degrees Fahrenheit, as shown, to indicate the value of certain vertical lines, not shown. Preprinted horizontal lines, not shown, can be used to indicate time. Line 99 is produced by recording pen 89, FIGURE 2. Horizontal section 101 in line 99 is the point in time at which the chart drive and program 73 were energized. Section 103 is sloped according to the rise in temperature of fluid 11. Point 105 indicates the softening point of sample 23 and is the point at which sensor switch 27, FIGURE 1a, cuts off 29 in FIGURE 2.

Although the present invention has been described using the illustrated components and cooperative relationships, it should be understood that the invention covers variations of these components, materials, and cooperative relationships that, in light of this disclosure, would be obvious to one skilled in the art. For example, the types of relays or switches used with sensor switch 27 to instrument the electrical control means can vary in number and use. The type of switching action performed by 37 in the sensor switch, FIGURE 2, will to a certain extent determine if additional relays or switches are required to control components 3 and 7 as described. The particular components, as well as their exact materials, shapes and connections, used in instrumenting the sensor switch can be varied as long as they combine to accomplish the purposes as defined above. Therefore, the scope of the present invention is limited only by the appended claim.

I claim:

A sensor switch for detecting an unbalanced condition and switching an electrical circuit comprising,
  (a) a nonconductive base member,
  (b) a pivot means attached to said base member,
  (c) a balance arm pivotally mounted on said pivot means including an electrically conductive section on one end and a nonconductive section on the other end,
  (d) a support means for holding a ring and ball tester connected to the nonconductive section of said balance arm, and
  (e) a mechanical actuator means including,
    (1) a generally U-shaped electrically conductive bridge attached to said base member and positioned over the conductive section of said balance arm,
    (2) an electrically conductive spring contacting said conductive section,
    (3) an electrically conductive adjustable screw connected to said bridge and adapted to apply pressure to said spring, and
    (4) an electrical contact attached to said base member so that said conductive section will pivot against same to complete the electrical circuit when the ball falls through the ring of said tester.

References Cited by the Examiner

UNITED STATES PATENTS

| | | | |
|---|---|---|---|
| 2,667,629 | 1/1954 | Frost | 200—85 X |
| 2,879,708 | 3/1959 | Cripe | 200—85 X |
| 3,105,490 | 10/1963 | Schoenfeld | 200—85 X |

BERNARD A. GILHEANY, *Primary Examiner.*
ROBERT K. SCHAEFER, *Examiner.*